April 7, 1936.  E. L. ROLFS  2,036,887

PIPE WRAPPING MACHINE

Filed July 13, 1932

INVENTOR
Eugene L. Rolfs.
BY D. W. Halstead
ATTORNEY

Patented Apr. 7, 1936

2,036,887

UNITED STATES PATENT OFFICE 2,036,887

PIPE WRAPPING MACHINE

Eugene L. Rolfs, Clayton, Mo., assignor to Johns-Manville Corporation, New York, N. Y., a corporation of New York Application July 13, 1932, Serial No. 622,260

6 Claims. (Cl. 242—11)

This invention relates to a pipe wrapping machine and particularly to an improved compact machine adapted for use in wrapping a pipe smoothly and conveniently while the pipe is in position in a trench.

The invention comprises a pipe wrapping machine provided with a pair of co-acting guide rollers for tautening the wrapping material in sheet form immediately before it is applied to the pipe that is to be wrapped and provided also with a plurality of supporting rollers carried by arms adjustably mounted upon spring controlled rocker sleeves. Further, the invention comprises means for adjusting the position of the supporting rollers, thereby adapting the machine for either large or small size pipe, and adjusting the angle between the axes of the rollers and of the pipe being wrapped, including means for indicating the angularity of the rollers, with respect to the length of the pipe, whereby all of the rollers engaging the wrapped pipe may be readily set at the same angle. The invention comprises, also, the provision of a mechanism embodying the above features, that is compact and that may be operated upon a pipe in a trench without excessive enlargement of the trench.

This invention is illustrated in the drawing in which.

In the figures like reference characters denote like parts.

Figure 1:
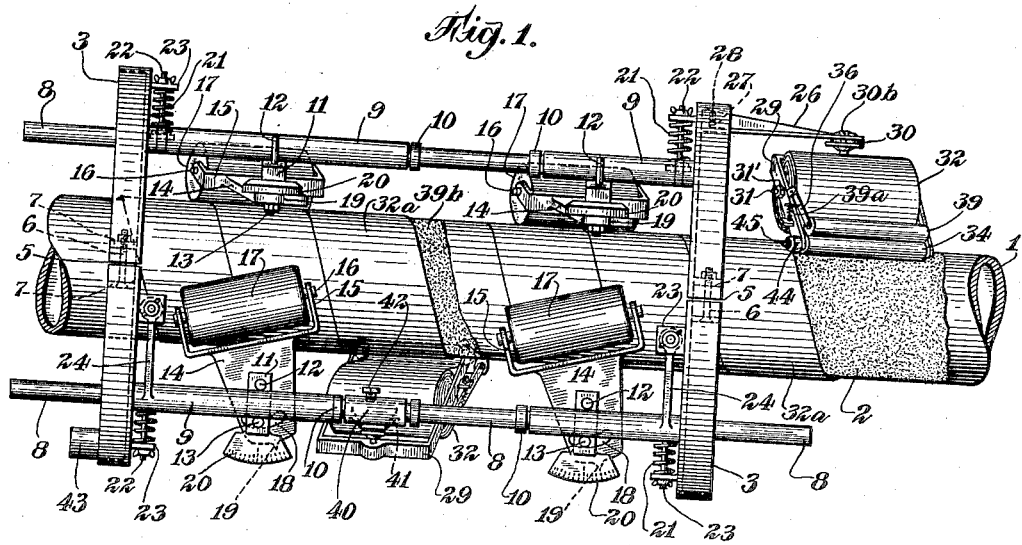
Fig. 1 is a side elevational view of the improved pipe wrapping machine in position around a pipe that is being wrapped.

Thus, 1 denotes the pipe that is being wrapped, which is suitably provided with a bituminous coating 2, of asphalt or the like. The pipe wrapping machine which is rotated around the pipe includes circular members 3, one disposed near each end of the machine and defining the outer dimensions of a cage-like structure. These circular members are each provided on one side with a hinged joint 4 and on the opposite side with locking joint 5, so that the members may be opened on the hinge joint for mounting the machine upon the pipe or for removal therefrom. The two members may be closed and held tightly together at the joint 5 by means of latch bolt 6, inserted through lugs 7, on either side of the joint 5.

The members 3 may be circular, square, hexagonal, or of other suitable shape. These members 3 are connected together by a plurality of rods 8, attached or welded thereto, which extend longitudinally with respect to the axis of the pipe 1, and are spaced therefrom. Besides contributing to the framework of the machine, these rods provide supports for various elements, as will appear later, and also function as handles whereby the operator may rotate the machine manually around the pipe. The number of these rods, as illustrated in the drawing, is four, although they may be of a different number, as, for example, six. Mounted upon the rods, before the rods are secured to the members 3 by welding or other means, are sleeves 9, supported upon the rods. The sleeves are prevented from sliding lengthwise of the rods by collars 10, which may be attached or spot-welded to the rods at positions adjacent to the ends of the several sleeves.

Attached or welded to the sleeves are bolts 12 and 13, for supporting the arms 14 having yokes 15 carrying shafts 16, upon which are mounted supporting guide and smoothing rollers 17. For reducing friction and increasing the smoothness of operation of the machine, these rollers may be mounted on ball bearings. Mounted on the bolts 12 and 13 between the sleeves and the arms 14 are replaceable spacer blocks 11. It will be apparent that by removing one or more of the spacer blocks that the rollers will be positioned at a greater distance from the axis of the machine, thereby adapting the machine for either large or small size pipes, depending upon the number and the thickness of the spacer blocks used.

Each arm 14, which connects the yoke to the sleeve 9, is provided with a hole through which the bolt 12 passes, and with an arcuate slot 18, which engages the bolt 13. When the nuts on the bolts 12 and 13 are loosened, the arm may be pivoted around the bolt 12, with the attendant shifting of the bolt 13 within the slot 18. The arm may be provided also with a pointer or indicator 19, which indicates on a graduated scale 20, suitably carried by an adjacent spacer block, the position of the axis of the roller with respect to the axis of the pipe. With such means it is possible to shift the angle of all of the rollers at will to the identical angle with respect to the length of the pipe. When the same proper angular position of the rollers has been effected, the nuts on the bolts 12 and 13 are tightened to secure the rollers in the selected position.

Means are provided for pressing the supporting rollers 16 against the wrapped pipe. These means comprise, preferably, a spring means acting upon each of the rocker sleeves 9 and tending to cause the sleeves to rotate in such a direction as to hold the rollers yieldably against the outer surface of the wrapped pipe. Thus the mechanism may comprise a headed bolt 22, adjustably threaded at one end to lug 23, on the ring member 3, and engaging at its other end a slot or hole in the rocker arm 24 attached to the sleeve. A coiled spring 21 is mounted on the bolt between the lug 23 and the arms 24 which tends to press the free end of the rocker arm inwardly, thereby yieldably holding the supporting roller against the pipe.

Figure 2:
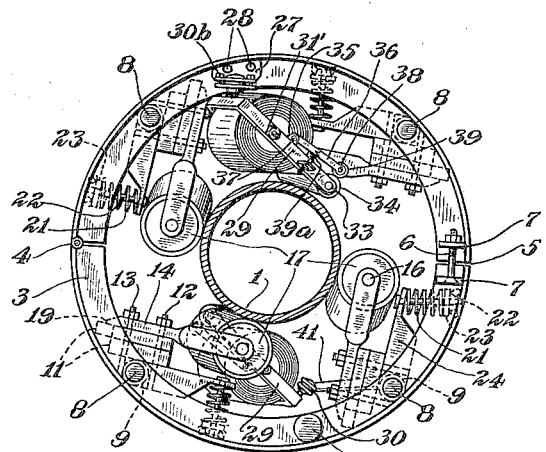
Fig. 2 is an end view as seen from the end at the right side of Fig. 1.

Suitably supported, by means of the bracket arm 26 having a base 27 secured to a member 3 by means of set screws 28 (Fig. 2), is the wrapping material feeding mechanism. This feeding mechanism comprises a fork frame 29 adjustably supported upon the bracket arm by means of a ball and socket joint, having set screws 30b. The fork is provided with holes through which extend a shaft 31, on which is mounted a roll of wrapping material 32. The wrapping material 32a may be of the type conventionally used in wrapping oil or gas pipe lines, say preformed sheet material such as asphalt-impregnated rag or asbestos felt. The sheet material should be flexible and coherent and thus adapted to be wrapped around a pipe. The arms of the fork extend beyond the roll and support a second shaft 33, on which is mounted a small roller 34. Pivoted to lugs 35 on the fork are a pair of links 36 carrying at their free ends a shaft 38 upon which is mounted a small companion roller 39. Both of these rollers may be knurled to increase the friction on the material fed therethrough. The rollers are held tightly together in any suitable manner, as by a tension spring 39a.

To retard the movement of the knurled rollers, to prevent overrunning of the paper, and to increase the tautening action of the rollers, a braking element may be used. The braking element 44 may be of conventional design and include a spring and tightening nut 45 at the position of engagement of the axis 33 in a hole in the fork 29. The roll of wrapping material may also be retarded by brake means 31¹ on the end of shaft 31.

When it is desired to apply more than one layer of wrapping paper to the pipe there may be provided a second paper feeding mechanism of the same type described above. The second paper feeding mechanism is placed in such a position on the machine that it will deliver a layer of paper to the pipe after the pipe has been wrapped with the first layer, so that the webs of the upper layer will cover the lapping joints of the lower layer. Such a pipe wrapping combination is illustrated in Fig. 1. There is also illustrated in connection with this arrangement, an alternative method of mounting the paper feeding mechanism. Thus, the paper supplying mechanism may be carried by a sleeve 40, mounted on one of the rods 8 and adjustably secured thereto by set screw 42. The fork 29 is pivotably secured to the sleeve by a ball and socket point 30 and arm 41, carries the roll of paper and is provided with the accessories described in connection with the first paper supplying mechanism.

For the purpose of balancing the machine when only one roll of wrapping material is applied or a plurality of rolls used are of unequal weight, a counter weight 43 is suitably attached to the ring member 3, to offset uneven distribution of weight. A plurality of these weights may be used and adjustably attached to the member 3.

The method of operation of the machine will be apparent from the description that has been already given. The machine is clamped around the pipe. A roll of paper is supplied to the paper feeding mechanism and threaded between the two rollers 34 and 39. A coating of asphalt is applied to the pipe and the end of the paper that has been threaded between the two knurled rollers is adhered to the coating of asphalt. The supporting rollers 16 having been set at the desired angles, by shifting of their supports or mounting means, and brought into firm contact with the outside of the pipe, as by the adjustment of the screw and coil spring mechanism and possibly also with the use of proper spacing blocks 11, the machine is rotated around the pipe by the operator pulling or pushing successively on the handle bars 3. As the mechanism is rotated, the inclined rollers 16 cause the mechanism to advance along the pipe, to the right of Fig. 1, and the wrapping material to be applied over the previously coated pipe. Each roller, moving over the wrapping material applied to the pipe, irons and smooths the wrapping material upon the pipe. The paper passing between rollers 34 and 39 is held taut as it is applied to the pipe. The roll feeding mechanism is oriented on the universal joint until the paper is equally taut on both edges; then it is clamped in position by the set screw. In this orientation, the axes of rotation of the knurled rollers 34 and 39 are made to extend at a right angle to the side edges of the sheet of paper being passed between the rollers.

The machine has features of advantage in addition to those that have been indicated.

It will be observed, in the first place, that the means for holding the rollers 16 and pressing them against the wrapped pipe, are disposed nearer to the pipe, or at least as near thereto, as the outside of the ring members 3. Therefore, a trench which is wide enough to receive the members 3 will receive also the rollers, their supports and adjusting devices. Also, the paper feeding mechanism may be likewise disposed near the pipe, so that the whole mechanism may be operated in a trench of small size. This makes it possible to use the machine in repairing a previously laid wrapped pipe line without excessive excavation.

The rollers being supported on a rocker arm mechanism are readily movable towards or away from the pipe. Since they are, in effect, trailers and are drawn over the wrapped pipe as the mechanism is rotated, they are less apt to jam on their supports or to be permanently distorted than in the type of mechanism in which the rollers are pushed straight against the wrapped pipe. The drawing of the rollers in trailer fashion serves not only to smooth the coating but also to straighten or tauten the wrapping paper. Furthermore, the rocker arm support makes possible a leverage action of the tightening mechanism, on a relatively long, readily adjustable arm; because of the small angle between this arm and the tangent to the pipe at the position of contact with the roller, the whole is compact in spite of the length of the arm. The rocker arm support for each supporting roller extends in a plane that is generally approximately parallel with and always at an angle that is substantially less than 90° with a tangent to the circumference of the pipe at the line of contact with the smoothing roller. In other words, the arm is disposed at an angle of substantial magnitude, suitably approximately a right angle, as illustrated, to the direction of a line extending radially from the center of the pipe to the position of contact between the circumference of the pipe and the roller supported by the said arm. It will be understood that the coating and/or wrapping material is included within the meaning of the term "pipe" as the member upon which the rollers rest, in this connection and elsewhere throughout the specification and claims. Thus, the statement to the effect that the rollers support the frame rotatably upon the pipe includes the condition in which the rollers support the frame rotatably upon the wrapping material disposed around the pipe. The supporting rollers as well as the paper feed rollers may be surfaced with a resilient material of the type of a vulcanized rubber compound.

The sheets of paper applied may be in the form of bands, say, of 9 to 12 inches or other convenient width and of great length.

With the spacing blocks and other adjusting features of the machine, one machine may be used for wrapping pipes of different sizes. Thus one machine has been used successfully to wrap pipes of nominal diameter of 8, 10 and 12 inches.

The amount of overlap of the wrapping material on the pipe depends upon the angularity of the supporting rollers, and by means of the indicator and dial arrangements the rollers may be readily adjusted to the same angular positions, to eliminate any tendency of opposition or dragging of the rollers.

The details that have been given are for the purpose of illustration and not restriction, and many variations therefrom may be made without departing from the spirit and scope of the invention.

What I claim is:

1. A pipe wrapping machine comprising a frame, means for applying protective preformed flexible coherent sheet material around the pipe, rollers supporting the frame rotatably upon the pipe, and rocker arms connecting the rollers to the frame, the said rocker arms being disposed each at an angle to the direction of a line extending radially from the center of the pipe to the position of contact between the circumference of the pipe and the roller supported upon the arm.

2. A pipe wrapping machine comprising a frame, means for applying protective preformed flexible coherent sheet material around the pipe, rollers supporting the frame rotatably upon the pipe, and spring-pressed rocker arms connecting the rollers to the frame, the said rocker arms being disposed each at a substantial angle to the direction of the length of the pipe and also of a line extending radially from the center of the pipe to the position of contact between the circumference of the pipe and the roller supported upon the arm.

3. A pipe wrapping machine comprising a frame, means for applying protective preformed flexible coherent sheet material around the pipe, rollers supporting the frame rotatably upon the pipe, rocker arms connecting the rollers to the frame and being disposed each at an angle to the direction of a line extending radially from the center of the pipe to the position of contact between the circumference of the pipe and the roller supported upon the arm, and means for varying the distance of the rollers from the longitudinal axis of the said machine while preserving the said angle of disposition of the rocker arms.

4. A pipe wrapping machine comprising means for applying protective preformed flexible coherent sheet material around the pipe, a frame having end members extending around the pipe, rods connecting the end members to each other, rocker arms secured pivotally on the said rods, smoothing rollers secured rotatably to the ends of the rocker arms remote from the said rods and supporting the machine rotatably upon the applied protective material, means for pressing the rollers yieldably against the protective material, and means for holding the rocker arms each in a plane that is substantially inclined with respect to a line extending radially from the center of the pipe to the position of contact between the circumference of the pipe and the roller supported upon the arm.

5. A machine of the type described in claim 4 comprising replaceable spacing elements disposed between the rocker arms and the said rods, whereby the spacing between the rocker arms and the rods may be varied.

6. A pipe wrapping machine comprising a cage-like frame, members at each end adapted to extend around the pipe to be wrapped, elements of the type of rods secured to the end members and extending therebetween, rocker sleeves mounted upon the said elements, arms connected to the said sleeves, rollers supported upon the said arms and adapted to support the machine rotatably upon the pipe, means for adjusting the angular position of an arm with respect to the direction of a line extending radially from the center of the pipe to the position of contact of the circumference of the pipe with the roller supported on the arm, and means for variably spacing the arm from the sleeve supporting the said arm.

EUGENE L. ROLFS.